April 1, 1930.　　　　　P. DEGN　　　　　1,752,894

FLOATING DOCK FOR WATER AIRCRAFT

Filed May 22, 1928　　　2 Sheets-Sheet 1

Inventor:
Paul Degn.
by
Watson, Coit, Morse & Grindle
Attorney.

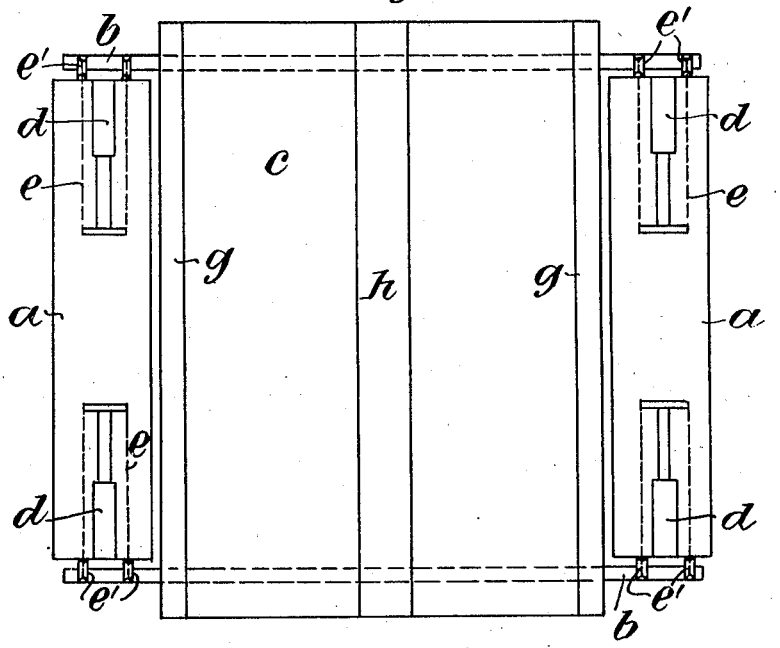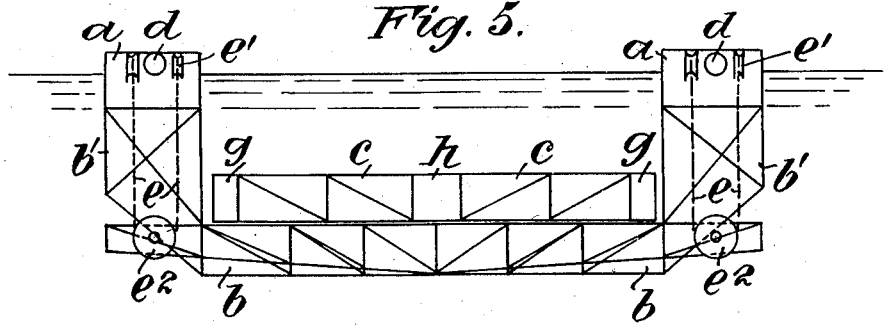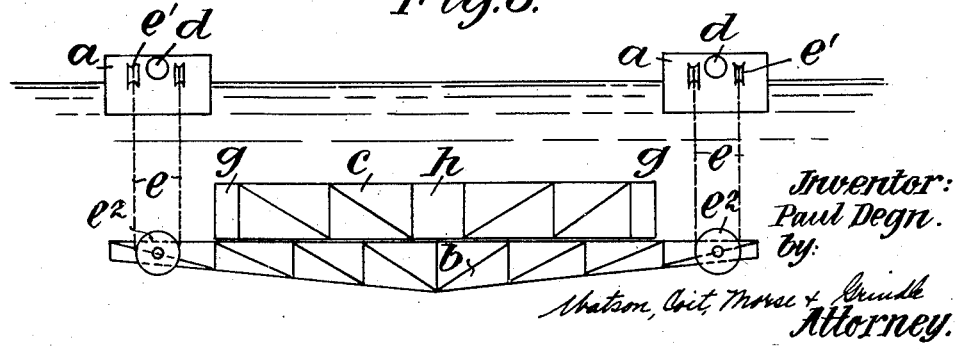

Patented Apr. 1, 1930

1,752,894

UNITED STATES PATENT OFFICE

PAUL DEGN, OF KIEL-DIETRICHSDORF, GERMANY, ASSIGNOR TO THE FIRM HOWALDTS-WERKE AKTIENGESELLSCHAFT, OF KIEL-NEUMUHLEN-DIETRICHSDORF, GERMANY

FLOATING DOCK FOR WATER AIRCRAFT

Application filed May 22, 1928, Serial No. 279,827, and in Germany May 3, 1927.

This invention relates to improvements in floating docks for water aircraft and particularly hydroplanes, flying boats and the like with laterally extending supporting surfaces or planes.

Ordinary floating docks are not economical for the purpose, for the span between the tall submersible side chambers or walls must be so great as not to interfere with the lifting surfaces of an aircraft to be docked.

Floating docks are known in which the side chambers are not submersible, the bottom being a submersible pontoon with columnar guide members extending vertically upwards through hollow spaces in the side chambers. Such docks also are unsuitable for water aircraft and are not practicable, for tilting of the pontoon causes jamming of the guides and such tilting must inevitably occur in practice. Moreover, the extension of the columnar guide members above the side chambers offers obstruction to the supporting surfaces or planes of the aircraft.

The principal object of this invention is to construct an aircraft dock in which a bottom platform is adapted to be raised and lowered between suitably low side chambers or walls by lifting gear. With such a dock, the lifting surfaces or planes of the aircraft are not obstructed and complete control is retained over the bottom platform in the raising and lowering thereof.

Another object is to provide the bottom platform with chambers or cells adapted for stabilizing the said bottom and for reducing the dead weight to be raised by the lifting gear.

Further objects are to provide suitable dock constructions comprising side chambers connected by cross members and adapted for the working therein of the rising and falling bottom. Said further objects include that of adapting the bottom for transporting or rafting an aircraft load away from the dock to a desired place.

These and other objects and features will be described in the body of the following specification with reference to examples illustrated in the annexed drawings, said examples being given merely by way of illustrations and in no wise limiting the invention.

In the drawing:—

Figure 1 is a diagrammatic plan view illustrating one form of dock embodying the principles of the present invention;

Figure 2 is an end elevation corresponding to Fig. 1 but illustrating a slightly modified construction;

Figure 3 is an end elevation of a modified construction.

Figure 4 is a plan and

Figure 5 is an end elevation of another modified construction, and

Figure 6 is an end elevation of a variant of the construction seen in Figures 4 and 5.

Similar parts are designated with similar reference characters throughout the drawings.

In Figure 1, the transverse members $b$ are vertically movable with respect to the floats $a$, and are elevated and lowered by means of hoisting gear, the platform $c$ being heavier than water and merely resting on the members $b$.

Referring to Figures 1 and 2, the dock comprises two side chambers $a$ connected together at a suitable depth by transverse supports or beams $b$. The side chambers are hollow flotation chambers and constitute the side walls of the floating dock. As will be apparent from Figure 2, these chambers or walls do not extend to any considerable height above the surface of the water so that they do not obstruct the supporting surfaces of an aircraft seeking to enter the dock. The transverse members $b$ may be of the lattice girder or openwork type illutrated. Within the dock there is a rising and falling bottom $c$, the main portion of which, namely that portion upon which the aircraft will be supported, being of the lattice or openwork construction, if desired. In Figure 2, the bottom $c$ is lowered on to the transverse members $b$, and the depth of the latter is such as to support the bottom $c$ at a depth which is a little greater than the draught of the water aircraft normally to be expected to make use of the dock.

The bottom $c$ is operated by raising and lowering gear which, in the example illustrated, comprises horizontally disposed fluid pressure cylinders $d$ containing plungers $d'$ fitted with cross heads $d^2$. These cylinders are conveniently arranged in the side chambers at the ends thereof. Chains $e$ having their ends fixed to the cross heads $d^2$ are passed over guide sheaves $e'$ and around compensating sheaves $e^2$, these latter being mounted on lateral extensions $f$ at the ends of the bottom or platform $c$. With this lifting gear, it is possible to raise the bottom $c$ by a single stroke of the plungers $d'$ from the lowered position seen in Figure 2 to the elevated position indicated by chain line in that figure, the latter position being that in which an entered aircraft is lifted clear of the water.

It will be apparent that other forms of hydraulic gear may be employed and that lifting gears whether of the fluid pressure or electrical or mechanical type may be adopted with equal facility.

In the construction illustrated in Figure 2, the sides of the dock comprise the flotation chambers $a$ and lower structures depending from these chambers and adapted, if desired, for affording guidance to the bottom $c$ in its rising and falling movements, these lower structures being connected together by the transverse beams or members $b$. In Figure 3, the last named parts are dispensed with and the sides of the dock are connected together solely by the bottom $c$ itself having a suitable sliding engagement with the lower structures of such sides.

The means for guiding the bottom $c$ in the structures depending from the chambers $a$ during the rising and falling movement of the bottom may assume the form illustrated in Figure 2, in which guiding flanges $p$ are rigidly mounted on the structures depending from the chambers $a$ for engagement with the lateral extensions $f$ on the bottom $c$. These guides serve as a convenient means for preventing movement of the bottom $c$ in directions other than vertical.

In view of the inconsiderable weights to be raised in an aircraft dock, the side chambers may be so dimensioned that they can perform slight rising and falling movements only, and since deep draught hulls are not expected to be encountered in water aircraft, the dock may be so dimensioned that even the largest aircraft may be run in, when the bottom $c$ is lowered, without fear of any interference between the sides of the dock and the lifting surfaces or planes of the aircraft. On account of the comparatively slight weight of aircraft to be docked, the bottom or platform $c$ may in most cases be of the openwork structure referred to so that the raising and lowering of the same may be performed mechanically and more rapidly than it could be performed by pumping out a hollow body. For the purpose of avoiding distorting stresses in the various parts during raising and lowering of the dock, it is to be recommended that the constructional parts beneath the chambers $a$, which parts serve for connecting the floating bodies together beneath the bottom $c$, should be connected to the floating bodies or chambers $a$ by means of universal joints, this recommendation being particularly applicable in regard to the construction in Figures 1 and 2.

It will be noted by reference to Figure 2 of the drawings that the chambers $a$ and the transverse members $b$ are illustrated diagrammatically at $s$ as connected by means, such as a universal joint, to permit slight relative movement of the chambers $a$ to avoid distortion of the structure.

In the constructions described above, the raising and lowering apparatus must balance or overcome the combined weight of the bottom $c$ and of the aircraft to be docked. The constructions hereinafter described have for their object to enable the lifting power to be reduced to a minimum. This is accomplished by providing the bottom or platform $c$ with air chambers or cells, the air capacities being calculated for balancing the weight in question to a suitable extent. The weight actually to be lifted by the gear may then be so small that the position of equilibrium of the bottom or platform $c$ is just preserved and the depth of submersion of the supporting pontoons is reduced to a minimum.

If the cells or chambers in the said bottom $c$ are disposed so that they serve as stabilizing tanks as well as flotation chambers, the further advantage may be achieved that the platform or bottom $c$ may be adapted for being run into and out of the dock for the purpose, for example, of enabling it to be taken, together with the aircraft lifted out of the water, to one or more workshops of the repair yard.

Referring to Figures 4 and 5, the transverse beams or a bottom structure $b$ is suspended by lifting gear and is vertically movable in guides $b'$ depending from the side chambers $a$. The lifting gear, as shown, may be similar to that described with reference to the preceding figures. The bottom or platform $c$ rests freely upon the transverse beams or bottom structure $b$. The platform $c$ is here provided with three longitudinal cells or tanks which may be sub-divided in any suitable manner. The two side cells or tanks $g$ may remain empty permanently in which case their air contents serve for the weight-balancing above referred to as well as for stabilizing the submerged bottom or platform $c$. The middle cell or tank $h$ may be employed for balancing the weight of the platform $c$. If the lateral cells or tanks $g$ are employed solely as air containers, however, the middle tank $h$ must be adapted for flooding. The filling conditions of its cells or compartments should then be so designed that the weight of water to be removed therefrom need be only a little greater than the weight of the aircraft to be lifted. The weight of the water to be removed must be greater than the weight of the aircraft by an amount sufficient for overcoming the weight of the platform or bottom $c$ to enable the latter to float. A certain iron weight or dead weight of the submerged platform $c$ is still necessary, however, in order to preserve its condition of equilibrium during raising and lowering.

The construction illustrated in Figure 6 differs from that illustrated in Figures 4 and 5 in respect of omission of the depending guide members $b'$, the sole connection between the side chambers $a$ and the transverse members $b$ supporting the platform $c$ being constituted by the lifting gear $e$.

In constructions in accordance with this invention, it is immaterial whether the emptying of the chambers or cells is performed by pumping or by pneumatic pressure or the like, and such emptying may even be performed by draining provided that a sufficient raising of the platform $c$ is obtained by means of the devices $d\,e$. If the side tanks $g$ are permanently filled with air it is only necessary to empty the middle tank $h$ for the purpose described. The emptying of this tank is very simple, since it may be accomplished by merely making a hose connection, for example.

It will be understood that the invention is capable of various changes and modifications without departing from the invention herein described and defined in the appended claims.

I claim:—

1. Floating dock for water aircraft comprising a liftable bottom member, shallow floating sides, vertically extending guide means operatively connecting said bottom member with said sides, transverse members connecting said sides below the maximum depth of submergence of said bottom member, and lifting gear disposed on said sides and operatively connected with said liftable bottom member.

2. Floating dock for water aircraft comprising a liftable bottom member, sides of shallow depth and embodying flotation air chambers, a transversely extending structure suspended from and connecting between said sides and adapted for supporting said liftable bottom member in the submerged condition of the latter, guide means operative between said bottom member and said sides, and lifting gear disposed on said sides and operatively connected with said liftable bottom member.

3. In a floating dock, the combination with a liftable bottom member, of floatable sides, transverse members pivotally connected with said sides below said bottom member, and lifting gear disposed on said sides and operatively connected with said liftable bottom member.

4. In a floating dock for water aircraft, the combination with a liftable bottom member, of shallow floatable sides, transverse members connected with said sides for universal movement with respect thereto disposed below said bottom member, and lifting gear disposed on said sides and operatively connected with said liftable bottom member.

PAUL DEGN.